Figure 1:
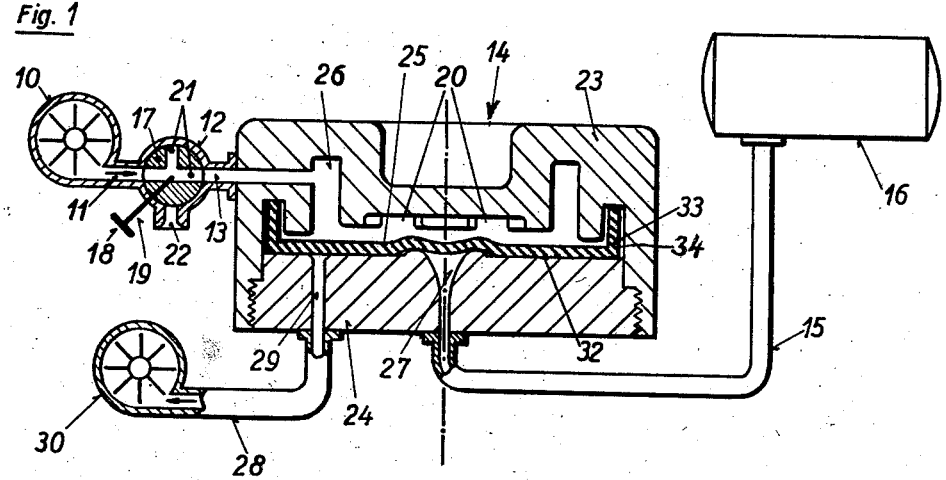

Sept. 7, 1954     R. KEHRER ET AL     2,688,342
CONTROL DEVICE
Filed Feb. 29, 1948     2 Sheets-Sheet 1

INVENTORS:
R. Kehrer and S. Keller
BY Richards & Geier
ATTORNEYS

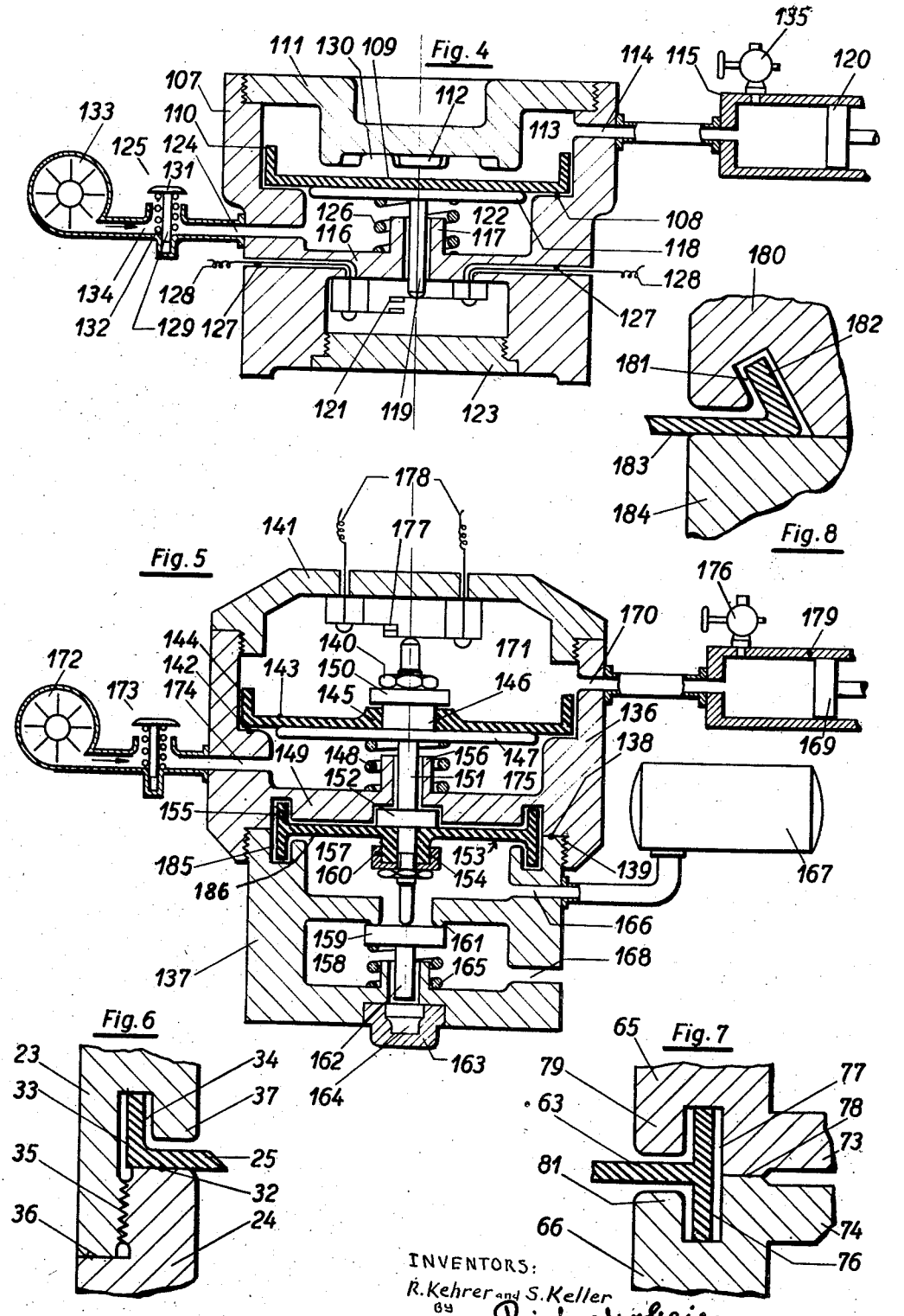

Patented Sept. 7, 1954

2,688,342

UNITED STATES PATENT OFFICE 2,688,342

CONTROL DEVICE

Robert Kehrer, Zurich, and Siegfried Keller, Effretikon, Switzerland, assignors to Machine Tool Works Oerlikon, Administration Company, Zurich-Oerlikon, Switzerland, a Swiss company Application February 29, 1948, Serial No. 12,186

11 Claims. (Cl. 137—788)

The invention relates to a control device having a diaphragm subjected to forces exerted by a fluid. The present application is a continuation, in part, of the co-pending patent application Serial Number 749,422 filed May 21, 1947, now abandoned.

The diaphragms hitherto in use have a flat plate-shaped form and, for the purpose of connecting them with other members, are clamped at their edges or at other points between parts of these members. This is a disadvantage in that the diaphragm breaks as the result of the effect exerted by the repeated elastic bending that takes place in the vicinity of the clamped part. An additional significant disadvantage is present in diaphragms made of non-metallic material as, for example, synthetic rubber. Here the diaphragm, in course of time, develops a leak at the clamped part, and the easily deformed material is squeezed out.

The main object of the present invention is to provide a diaphragm which does not incorporate these disadvantages.

An additional object of the invention resides in the advantageous construction of such diaphragm in conjunction with control devices whose diaphragms are elastically deformed by means of pneumatic or hydraulic pressures, whereby these deformations are utilized for control of any particular processes such as, for example, the closing of electric circuits or the actuation of valves.

In one preferred embodiment of the inventive idea, the diaphragm which preferably is made of synthetic rubber, leather or the like, is of round plate-shape on whose circumference there is an outer flat and thin packing flange extending normally to the plane of the plate on both sides of same, and where provision has also been made in the centre part of the plate around a hole, for an inside packing flange of the same form. This diaphragm is situated in a cavity of a cylindrical two-part casing and divides this cavity in two parts, which are closed and separated from one another. For the purpose of fixing the diaphragm in the casing wall, a ring groove has been formed in each of the dividing surfaces of both casing-halves and in such a way, that when both casing parts are united, the two grooves fit one into the other and allow the diaphragm to receive the outside packing flange. In order to permit the passage of the diaphragm plate out of the cavity of the casing into the ring groove, a slot in the casing wall has been provided whose width is a little greater than the thickness of the diaphragm plate, so that a jamming of same cannot take place. Similarly, the ring groove is of such a width that the packing flange is able easily to move in it.

In the hole in the centre of the diaphragm, there is fitted a bolt extending on both sides of the diaphragm plate and whose ends work in conjunction with electric contacts, whereby these ends are movable in special guides provided in the cavity of the casing. On both sides of the diaphragm plate a rigid disk has been fitted which, in its central part, is provided with a cap-shaped camber in which the inner packing flange of the diaphragm fits. Both disks are, moreover, attached to the bolt already referred to. On both parts of the cavity in the casing that are produced by the diaphragm there are connected, by means of the bore provided in the casing wall, two pressure lines originating from a cock; in addition, this cock is provided with an outlet to the outside air and connected to a compressed air container. By actuating the cock, the compressed air container can be connected, at will, with either of the two parts of the cavity in the casing, whilst at the same time, the other part is connected to the outlet of the cock. If in this way one part of the cavity is subject to the pressure present in the container, whilst the other part is under atmospheric pressure, then the diaphragm becomes slightly deformed, and the bolt fixed therein is axially displaced, so that one of the contacts referred to will be closed. The same procedure takes place in the reverse order when the cock is turned the other way. Thus the control device can be actuated pneumatically, by turning the cock in the one or other direction. If one of the two parts of the casing cavity is under pressure, then this pressure will be transmitted to the two packing flanges of the diaphragm; thereby the outside packing flange will be pressed elastically against the circumscribed surface of the ring groove, the inside packing flange however is pressed against the bolt and thus, in this way, an equalization of pressure is prevented, not only towards the part of the cavity subject to atmospheric pressure, but also towards the outside of the casing.

Figure 2:
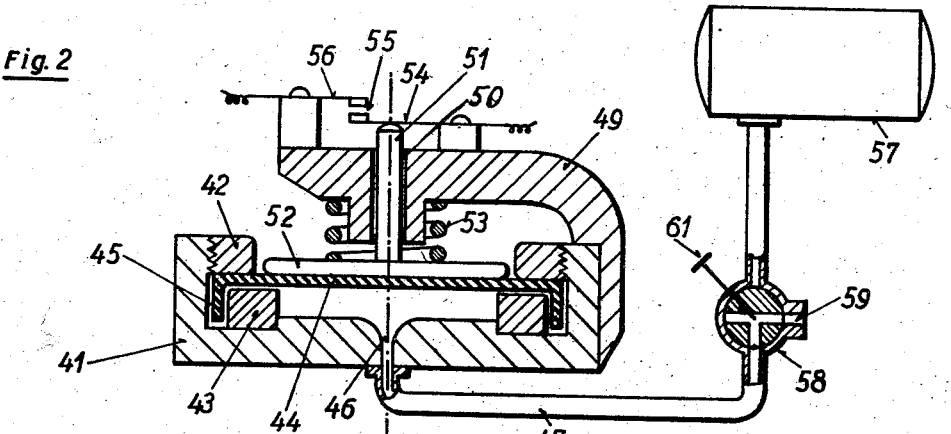
Figure 3:
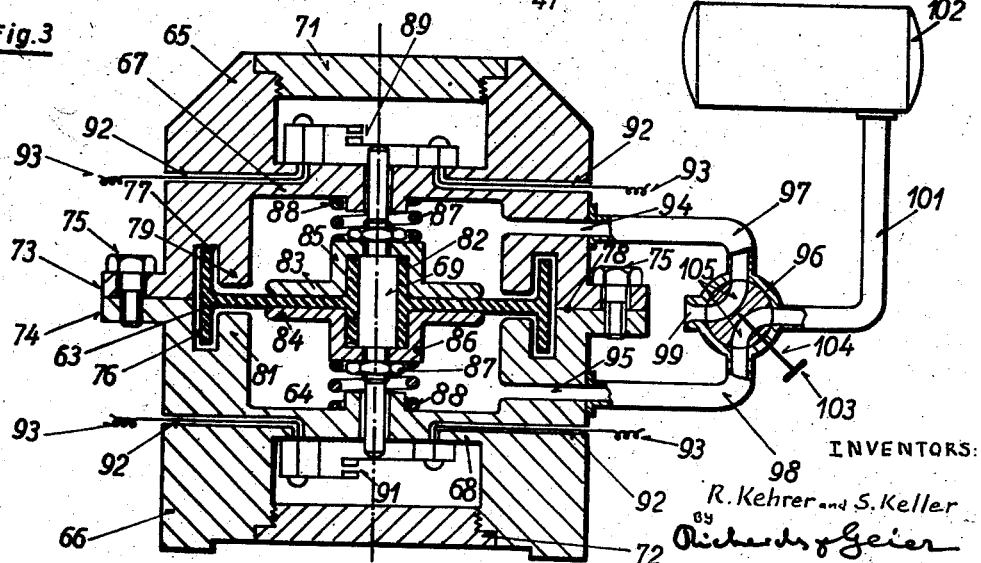

The following detailed description, and the accompanying drawing, explain more clearly and by way of example the functions of this invention. The drawing shows:

Fig. 1. An axial section through a control device;

Fig. 2. An axial section through a second construction;

Fig. 3. A variant of the construction in accordance with Fig. 2, similarly shown as an axial section;

Fig. 4. An axial section through a third construction;

Fig. 5. A variant of the construction in accordance with Fig. 4, in axial section;

Figs. 6 and 7. Part-sections of the construction in accordance with Figs. 1 and 3 respectively, shown on an enlarged scale.

Fig. 8. A part-section similar to that of Fig. 6.

In the control device according to Fig. 1, an air pump 10 is connected, via the tube piece 11, with the threeway cock 12, from which a further tube piece 13 leads to the valve 14, which latter is then connected, via a tube piece 15, with the compressed air container 16 and further, via the tube piece 28, with the pneumatic engine 30. The cock 12 is provided with a turnable plug 17 which, to enable it to be operated, is fitted with a bolt 19 having a hand grip 18 attached to it. The plug 17, furthermore, is provided with two interconnected bores 21, placed normal one to the other, which permit an interconnection of either the two tube pieces 11, 13 and the outlet 22 of the cock.

The valve 14 comprises the two casing parts 23, 24 which are symmetrical with respect to an axis shown as a dot-and-dash line, as well as the diaphragm 25. The casing part 23 is provided with the circularly-shaped cavity 26 in which the tube piece 13 is let in, and serving the purpose of transferring the pressure present in the latter on to the diaphragm 25. The central portion of the casing part 23 is at its lower end provided with a seat for the diaphragm 25 and openings 20 are provided in this seat allowing the air to reach the central part of the diaphragm plate from the cavity 26. In the lower casing part 24, provision has been made for a central bore 27, which, on the one hand, is connected to the tube line 15 and, on the other, ends in an enlarged opening that is covered by the diaphragm 25. Furthermore, in an eccentric position to the symmetrical axis of the casing part, provision has been made for the bore 29, to which the tube line 28 and motor 30 are connected.

As can be clearly observed from Fig. 6, the diaphragm 25 which, for example, can be made of synthetic rubber, rests—in the locked position as shown—on the surface 32 of the casing part 24. This diaphragm is provided on its external edge with a packing flange 33 which extends into a recessed ring-groove 34 situated in the casing part 23. The plate of the diaphragm 25 and the packing flange 33 have been constructed so thin that the latter, slightly deformed in radial direction, can be pressed against the one or other of the two cylindrical circumscribed surfaces of the groove 34. For this purpose it is necessary that no excessive pressure from casing part 23 be exerted on the upper edge of the packing flange 33, but rather that the latter should rest only lightly on the base of the groove 34 or, in certain circumstances, not at all. The depth of the groove 34 can thus easily be adjusted to the most favourable condition in that the upper casing part 23 which, for the purpose of connection to the lower part 24, is provided with a thread 35, is not—as Fig. 6 shows—wholly screwed down on to the rest surface 36, but the two parts are spaced by any suitable means (not shown). The diaphragm 25, at its point of exit from the groove 34, also does not contact—or possibly only slightly so—the end of the circularly-shaped part 37. As a result, when the diaphragm is being subjected to load, the diaphragm plate can at this point yield, without hindrance, in a radial direction, and any damage to material is avoided.

The working method of the control device according to Figs. 1 and 6 is as follows:

Let it be assumed that the pump 10 is constantly delivering air into the cavity 26 by way of the cock 12 in its position as shown, and that in the bore 27 there exists a certain excess pressure as distinct from the free atmospheric pressure. When pressure in the cavity 26 becomes high enough, then by means of it the diaphragm plate is pressed downwards on to the rest surface 32, as shown in Fig. 1, and thus a withdrawal of the air confined in the container 16, via the tube line 15 and the bores 27 and 29, is prevented. If the grip 18 of the cock 12 is now turned by 90° in a clockwise direction, then the cavity 26 is no longer in contact with the pump 10 but in fact is connected with outlet 22, and a drop takes place in the pressure present in cavity 26. When this drop becomes sufficient, the diaphragm plate is then lifted as the result of the pressure present in the container 16, whereby the connection is established between the bores 27 and 29. The compressed air contained in the container 16 now flows into the pneumatic engine 30 in the direction indicated by the arrow and actuates it. If the grip 18 of the cock 12 is turned by 90° in a counter-clockwise direction, then the pump 10 will again convey compressed air into the cavity 26, whereby the diaphragm plate is once more pressed on to the seat 32, so that the flow of air to the engine is interrupted and the latter comes to a standstill. As long as there exists an excess pressure in the cavity 26 in relation to the external space of the valve, this pressure will similarly be directed towards the groove 34 and in doing so, the packing flange 33 is pressed against the external cylindrical circumscribed surface of the groove. In this way, an escape of air round the packing flange 33 towards the threads 35 or to the underside of the diaphragm plate is prevented; the cavity 26, by means of diaphragm 25, is thus sealed outwardly. The control device can, for example, be employed for the pneumatic remote control of the engine 30, in that the cock 12 and valve 14 connected to it by means of the tube line 13, are placed at a distance from one another.

Having described above a control device with a valve, in the case of which a diaphragm directly opens and closes an opening that serves as an air passage, an embodiment will now be described, shown in Fig. 2, whose diaphragm transmits its motion to an auxiliary member serving the purpose of opening and closing an electric circuit. A cylindrical body 41 is provided with a bore in which the two rings 42, 43 and the diaphragm 44 are placed. The ring 43 in this way forms, in conjunction with the side wall of the body 41, a circularly-shaped groove in which the packing flange 45 of diaphragm 44 is placed. The width of this groove is such that the packing flange is given a little clearance in it. From above, ring 42—forming as it does a firm seat for the extreme edge of the diaphragm plate—is screwed in to the bore to an extent, which makes it possible to obtain best results regarding the seating of the edge of the packing flange on the bottom of the groove, as already described in Fig. 6. The body 41 is provided with a bore 46 in axial alignment, which bore has connected to it on the outside the tube piece 47. On the right side of the body 41 as shown in Fig. 2, an arm 49 is attached which is provided with a bore 50 extending in the direction of the axis of the body 46. In this bore there is situated the bolt 51 forming the auxiliary member already referred to and which bolt, fitted to be axially movable, carries at its lower end the disk 52 resting loosely on the diaphragm plate 44. A cylindrical spring 53 constantly presses the disk 52 against the diaphragm plate 44. On the bolt 51 there rests a contact spring 54 whose one end is screwed to the arm 49, its other end bearing one of two contact pieces 55 lying above each other. The second of the two pieces is fitted to an additional spring 56 also connected to arm 49. Both contact pieces form part of an electric circuit not shown in detail and which, in the position of rest of the bolt 51 as shown, is open, will be closed by lifting the said bolt. A cock 58 has been fitted into the tube line 47 which connects the body 41 with the compressed air container 57 and which cock has been constructed in the same way as the one shown in Fig. 1.

The control device according to Fig. 2, functions in the following manner: In the rest position of the cock 58 as shown, the tube line 47 is closed in relation to the container 57 but remains in contact with the outside air via the outlet 59 of cock 58. As a result, the diaphragm plate 44, by means of the disk 52, is subjected merely to the influence of the pressure of spring 53, and is pressed on to the ring 43, so that the contact pieces 55 are separated from one another. If grip 61 is turned in clockwise direction by 90°, then the tube line 47 is cut off from outlet 59 and brought into contact with the container 57. The pressure present in the latter is now exerted on the diaphragm plate 44 and along the disk 52 and bolt 51, lifts it up until the disk 52 comes into position on the guide of bolt 51; in this way the electric circuit referred to which includes the contact pieces 55, is closed, by means of which any desired control action can be effected. An escape of the pressure originating from the container 57 round the packing flange can not take place, for, in a manner similar to the construction of Fig. 1, the cylindrical external surface of the packing flange is pressed against the inside wall of the bore in body 41. If the electric circuit must be opened again then, for this purpose, the grip 61 will have to be turned back into the described position of rest. In this way, the pressure present below the diaphragm plate escapes via the outlet 59, and the device returns, under the influence of the spring 53, to the described position of rest.

Fig. 3 shows a variant of the embodiment according to Fig. 2, in the case of which the working method of the diaphragm is fundamentally the same as in the latter case, in that this diaphragm also transfers its motion to an auxiliary member serving the purpose of controlling electric circuits. The diaphragm 63 is accommodated in a cavity 64 of a casing consisting of two rotary symmetrical halves 65, 66. In each of the casing-halves, traverses 67, 68 have been provided which form guides in alignment with the casing axis and bearing the ends of the bolt 69. In the casing, moreover, covers 71, 72 are screwed which outwardly seal the cavity 64 airtight. With the object of keeping the two casing parts together and at the same time fixing the position of the diaphragm in the casing, both halves of same have been provided with flanges 73, 74 in which screws 75 have been fitted.

Diaphragm 63 is, as will be particularly observed in Fig. 7, provided at its external edge with a packing flange situated on a plane normal to the diaphragm and extending on both sides of this plane—this packing flange being fitted into a recessed ring-groove 77, of the casing, having in cross-section a T-shaped form. The height of this packing flange has been so determined that it will be capable of movement in the groove 77 after the two casing parts 65, 66 have been pressed together on the surface 78 by tightening the screws 75. This is the case if a small clearance is provided between each edge of the packing flange and the adjacent groove bottom, and also if each edge of the packing flange comes to rest lightly on the adjacent bottom of the groove.

The point at which the diaphragm plate emerges from the circular groove 77 is of such width that any nip of the diaphragm plate is effectually avoided; in addition, the opposite parts 79, 81 of the two casing halves 65, 66 are rounded-off in order to prevent damage to the diaphragm when the latter bulges, under the influence of variations in pressure, to the one or other side.

The diaphragm 63 is provided with a packing flange 76 not only at its extreme edge, but also with an inside central packing flange 82 which similarly extends on both sides of the diaphragm surface. In the bore of the packing flange 82 there is inserted the central thicker part of the bolt 69. The diaphragm plate is held between two thin disks 83, 84 each of which is provided at its centre with a camber 85, 86. These two cambers form a cavity in which are accommodated the inside packing flange 82 and the thickened central part of bolt 69. The parts connected to this part of the bolt 69 are, by means of bores, passed through the two cambers and provided with threads on which the nuts 87 are placed. By means of these latter, the cambers 85, 86 are pressed on to the central part of the bolt 69 and at the same time and in this way the disks 83, 84 come lightly to rest on the diaphragm plate. The inside packing flange 82 is, in this case as well, only of such a height that it is incapable of being appreciably pressed together by the two cambers. The result of this is that—similarly to the construction of Fig. 7—compressed air which, for example, emerges from the upper part of the cavity 64 passing between the diaphragm plate and the disk 83 to the packing flange 82, presses this on to the central part of bolt 69 and in this way, prevents the passage of air to the lower half of the casing 66.

Situated on the two cambers 85, 86 are two cylindrical springs 88 which, on the other hand, are positioned, respectively, against the traverses 67 and 68 and which springs serve the purpose of maintaining the diaphragm 63, at equal pressure in the upper and lower part of cavity 64, in the position of rest as shown. The traverses sustain the two contact sets 89, 91 shaped in a manner similar to that shown in Fig. 2. Furthermore, these traverses have bores 92, through which wires 93 are led to the contacts 89, 91 in such a way that an equalization of pressure from cavity 64 through these bores to the outside air is prevented. For the purpose of passing compressed air into the two parts of the cavity 64, provision has been made in the two casing halves for bores 94, 95 to which the tubing pieces 97, 98, leading to the cock 96, are connected. The latter is provided with outlet 99 leading to the outside air and, furthermore, is in contact with tubing piece 101 leading to the compressed air container 102. Cock 96 is actuated by hand grip 103, borne by a bolt 104 connected to the plug of the cock. The plug is provided with the two channels 105 which serve the purpose of optional connection of the tube lines 97, 98 with the outlet 99 or the tube line 101.

The working method of the control device according to Fig. 3 is as follows: When the hand grip 103 is in the illustrated position, then the lower part of the cavity 64 communicates with the compressed air container 102, while the upper part of the cavity is in communication with the outside air. The diaphragm 63 is thus pressed upwards and closes, by means of the bolt 69, contact 89, whereas contact 91 remains open. If the hand grip be turned by 90° in the clockwise direction, then the upper part of the cavity 64 becomes subjected to the pressure prevailing in the container 102 whilst the lower part is exhausted. In that way, contact 89 is once again opened and contact 91 closed in place thereof. It is important for the proper working of the control device that no equalization of pressure can take place between the two parts of the cavity 64 and that, in addition, all outward escape of compressed air from one of the parts of the cavity 64 is prevented. These functions are carried out by the two packing flanges 76, 82. If, for example, the upper part of the cavity 64 is under increased pressure, then this pressure is transmitted to ring groove 77 and here presses the upper half of the packing flange 76 against the outer cylindrical circumscribed surface of the groove. Thereby an escape of compressed air, via both the plane of division 78 between the two casing-halves and round the lower half of the packing flange 76, is prevented; similarly, the upper half of the packing flange 82, by means of compressed air bleeding through the thread of the nut 87 to the flange 82 is pressed against the central part of the bolt 69 and hence prevented from penetrating into the lower half of the cavity. The movements of the diaphragm 63 are narrowly restricted in both directions by the guides provided on the traverses 67, 68 for the ends of bolt 69, these guides, at the same time, serving the purpose of stops for the nuts 87; in this way, a separation of the diaphragm plate from the packing flange is prevented.

Fig. 4 shows a control device whose diaphragm 109 serves a more general purpose as compared to the embodiments according to Figs. 2 and 3. The cylindrical one-part casing 107 has a seat 108 turned into it on which the diaphragm 109 rests. The latter, as stated in the previous description, is made of an elastic material, for example, synthetic rubber, and is provided at its extreme edge with a packing flange 110 projecting above the surface of the diaphragm. The upper end of the casing 107 has a cover 111 screwed into it air-tightly which is provided with a part 112 projecting into the inside of the casing and serving the purpose of an additional seat for diaphragm 109. This seat is provided with openings 130 allowing the air to reach the central part of the diaphragm plate from the cavity 113. Between this part and the inside casing wall, a circularly shaped cavity 113 is formed which, by way of bore 114, communicates with the cylinder 115 supporting the working piston 120. This piston may be used to actuate the brakes of a vehicle or for other purposes. The pressure exerted by the piston depends upon pressure prevailing in the cylinder 115. The lower half of casing 107 has arranged in its inside the traverse 116 which is provided with a sleeve 117 having a central bore extending in axial direction. In this bore a movable bolt 119 is fitted bearing the disk 118 and which serves the purpose of actuating contact 121. Below the diaphragm, in the casing 107, there is a cavity 122 which, by means of cover 123, is sealed off from the outside air and which communicates, via bore 124, with the valve 125. Sleeve 117 carries a cylindrical spring 126 which serves to press the disk 118, and with it bolt 119 and diaphragm 109, upwards. In casing 107 and on the traverse 116 provision has been made for bores 127 in which are contained the wires 128 leading to the contact 121. Valve 125 is provided with a disk 131 supported by bolt 129 which disk is pushed upwards by a spring 132. If the disk 131 is pressed downwards contrary to the action of the spring, then it will come to rest on a seat on the tube line 134 and hence will seal off this line from the outside air, connecting pump 133 with bore 124.

The control device according to Fig. 4, functions as follows: If valve 125 is in a position of rest as shown, then pump 133 will pump, via the open valve seat, towards the outside air and hence atmospheric pressure will also prevail in cavity 122. If the valve disk is now pressed down, then this results in an interruption of the line 134 with the outside air, and the pump 133 forces air into the cavity 122. In consequence, the edge of the plate of diaphragm 109, resting on seat 108, is pressed upwards, thus providing a communication between the cavities 122 and 113, and the air being delivered by the pump 133 is conveyed into the cylinder 115 via the cavity 113 and bore 114. The piston 120 then moves to the right while actuating the brakes. Then the pressure in cylinder 115 will increase due to the control of the valve 131 until the latter is opened. Then the pressure in the cavity 122 will drop immediately to atmospheric pressure level, while the pressure prevalent in cylinder 115 and the chamber 113 presses the diaphragm 109 on to the seat 108, and also presses the packing flange 110 against the inside wall of casing 107. This operation is repeated when the valve 131 is pressed down again, until the pressure in the cylinder 115 is the same as that produced by the pump 133. By repeated actuations of the valve 131 it is possible to increase stepwise the pressure in the cylinder 115 and thus to increase the braking action. The cavity 113 is thus sealed off from cavity 122 by the diaphragm 109. The diaphragm 109, in this way, functions as a non-return valve. At every opening of the valve 131 the diaphragm is pressed downwardly by the pressure prevailing in the chamber 113 and thereby moved away from its seat at part 112 and the disk 118, together with bolt 119, are pressed downwards, whereby contact 121 is closed. In this way, an electric circuit—not precisely shown—comprising the conductors 128, can be closed and any desired control or signal action can be started. To effect a return of the piston 120 to its position of rest, provision has been made in cylinder 115 for cock 135 through whose outlet an escape, to the outside, of the air confined in cylinder 115 can be brought about.

The embodiment according to Fig. 5 merely shows a variant of the embodiment according to Fig. 4, differing mainly from this by the addition of a valve that is to be actuated by the diaphragm. The control device includes a casing comprising the two rotary symmetrical halves 136, 137. The upper half 136 rests on the lower half at the surface 138 and is screwed to same by means of thread 139. In the upper casing-half 136, which is sealed air-tightly at the top by cover 141, a ring-shaped seat 142 is provided on which the diaphragm 143 rests with its edge bearing the outer packing flange 144. The central part of the diaphragm plate has been provided with a thickening or inner packing 145 and has a bore in which the upper part of a bolt 151 is inserted which penetrates both casing-halves along their axis. The bore in the thickening 145 of the diaphragm is somewhat narrower than the diameter of part 146 of the bolt 151, resulting in a tensile strain in the thickening 145, and effecting a firm fit of the thickening on the bolt 151. The diaphragm is furthermore locked in its position by a disk 150 which is held by the nut 140. On bolt 151 bears, in addition, the round disk 147 on which the diaphragm plate rests and which latter serves the purpose of transmitting a resultant downward deflection of the diaphragm plate on to the bolt 151. The disk 147 is subjected to the pressure from below exerted by the cylindrical spring 148 whose end is supported on a partition 149 that separates the upper casing-half 136 from the lower one. This partition is provided with a bush 156 in whose bore the central part of the bolt 151 is fitted and serving also as a stop for the disk 147 when the latter is in downward motion. To the lower part of the bolt 151 the ring 152 is secured, fitting in a turned-out part in the lower side of the partition or seat 149, on which rests the inside edge of a diaphragm 153 made of synthetic rubber. In the position as shown, this ring limits the upward movement of the bolt 151 and thereby also of the disk 147 and the central part of the diaphragm 143. The diaphragm 153 is provided not only with a packing flange 154 protruding on one side of the diaphragm plate 186, but also with an external flange 155 projecting over both sides of the diaphragm plate 186. Over the inside flange 154 resting against the bolt 151, cap 160 is placed resting on a seat provided for on bolt 151 and kept in position by a nut. The outside packing flange 155 is accommodated in a groove extending partly into the partition 149 and partly into the lower casing-half 137. The packing flange 155 is movable in the ring groove 185 in a manner similar to that shown in Fig. 7; by means of compressed air applied to it, it is pressed against one or the other circumscribed surface of the groove.

In the lower casing-half 137, the two cavities 157, 158 have been provided which, by means of the synthetic rubber valve body 159, constructed to rest on seat 161, can be sealed off from one another. The valve body 159 is secured to bolt 162 which is movable in a bore provided in the lower base of casing part 137 and which bore is sealed off from the outside by cover 163. A spring 165 has the function of pressing the valve body 159 on to its seat 161. The cavity 157 is in communication, via the bore 166, with the compressed air container 167, whilst the cavity 158, via the bore 168, is connected to a cylinder comprising a piston, which are both not shown. The control of the flow of air from the container 167 to this cylinder is undertaken by the movements of the diaphragm 143.

Apart from this control, the diaphragm 143 also serves the purpose of controlling the volume of air delivered to the cylinder 179. This cylinder, in which the piston 169 is movable, is in communication, via the bore 170, with the cavity 171 situated above the diaphragm 143. For the purpose of delivering compressed air to the cylinder 179, pump 172 is employed, which is connected to a cavity 175 situated below the diaphragm 143, via the bore 174 and, the valve 173, which is constructed similarly to the valve 125 shown in Fig. 4. A cock 176 fitted to cylinder 179 serves to exhaust the cylinder when the piston 169 has to be brought back to its original position. By means of the diaphragms 153, the two cavities 157 and 175 are wholly separated from one another, so that a transfer of compressed air from one to the other is prevented. In consequence, both pneumatic systems which, on the one hand are fed from pump 172 and on the other, from the compressed air container 167, are entirely independent of one another.

An additional control member dependent on the movement of the diaphragm 143, is the contact 177 whose contact springs are fitted to the inner side of the cover 141 and which contact is closed by means of the top end of the bolt 151. This contact forms part of an electric circuit embracing the wires 178 and not described in detail. In the position of rest of the diaphragm, contact 177 is kept closed by the end of the bolt 151; but if diaphragm 143 is bent downwardly, then, as the result of the downward movement of the bolt 151, the contact is opened.

The working method of the control device according to Fig. 5 is as follows: In the case of a non-actuation of valve 173 and when the piston 169 is not subject to pressure, atmospheric pressure will prevail in the cavities 171, 175 and the diaphragm 143, due to the influence of spring 148, will assume the position of rest as shown, and in which the valve body 159 will be pressed on to its seat 161 by spring 165 and contact 177 is kept closed by the top end of the bolt 151. If an actuation of valve 173 should now take place, then compressed air from the pump 172 will reach the cavity 175, lift the edge of the diaphragm 143 and flow through the bore 170 into the cylinder 179, where it then displaces the piston 169 to the right. If the valve 173 be released, then the cavity 175 will be exhausted and the pressure prevalent in cylinder 179 now presses diaphragm 143 on to its seat 142 and its packing flange 144 against the inside wall of the casing-part 136, whereby an equalization of pressure towards the cavity 175 is made impossible. The diaphragm 143, as the result of pressure exerted on it, is thus bent out downwards until the disk 147 comes to rest on the guide 156. In this way, the plate of the diaphragm is pressed on to the disk 147 whereby a transfer of compressed air is prevented along a path extending between part 146 of the bolt and the bore in the thickening 145, and between the diaphragm plate and the disk 147. By means of the downward movement of the bolt 151, contact 177 is, on the one hand opened and on the other hand, through its lower end the valve body 159 is lifted from its seat 161, so that compressed air can flow from the container 167 into the now interconnected cavities 157, 158, and from there into the cylinder referred to, but not shown. An escape of air from cavity 157 to the cavity 175 under atmospheric pressure, is, in this case, prevented by diaphragm 153, in that its inside packing flange 154 is pressed against the bolt 151 and its outside packing flange 155 against the cylindrical walls of the ring groove 185. In order to bring the piston 169 back again to its original position, it will suffice to open cock 176. The diaphragm 143 and with it bolt 151 and disk 147, now return to the position shown as the result of the influence of spring 148. Since valve body 159 is thus again pressed by spring 165 on to its seat 161, the cylinder connected to the bore 168 can in some way or other be exhausted, without the container 167 being able to run empty.

While all the diaphragms to be used and referred to in previous embodiments are provided with packing flanges which, in the main, extend normally to the plane of the diaphragm plate, Fig. 8 shows an embodiment, in accordance with Fig. 6, with its packing flange projecting obliquely to the plane of the diaphragm. In the upper casing-half 180 a groove 181 is formed in which the packing flange 182 fits. Both the upper casing half 180 and the outer edge of the diaphragm plate 183 rest on the lower casing-half 184. The packing flange 182 is provided with two conical circumscribed surfaces, parallel to one another, and faced by the parallel circumscribed surfaces of the groove 181. There is no necessity, in the case of embodiments with packing flanges projecting obliquely to the plane of the diaphragm, to incline such packing flange to the diaphragm plate; the packing flange may just as well be inclined to the outer side.

Whereas all diaphragms previously shown and described have a circular shape, the invention is not restricted to suuch diaphragms. Diaphragms having a rectangular, oval or other shape may just as well be used.

It will be apparent that while we have shown and described our invention in several preferred forms, other changes and modifications may be made in the structures disclosed without departing from the spirit of the invention, as sought to be defined in the following claims. Especially the diaphragms describd may be used in the place of the diaphragms shown in the copending patent application No. 755,705 (Control system for automatic single-chamber compressed airbrakes) now Patent No. 2,661,248.

What we claim is:

1. In a device of the character described in combination, a diaphragm comprising a flat plate and a packing flange, this latter being fitted at the rim of the plate, projecting beyond one side of it and being capable of radial deformation; a casing provided with a cavity closed by the diaphragm, a seat formed on said casing and fitted on that side of the plate, which is away from both the cavity and the packing flange and sustaining the the plate adjacent to its rim in axial direction, and a groove receiving at least a portion of the packing flange, said groove being formed in said casing adjacent to said seat, the width and depth of the groove allowing for a displacement of the free edge of the packing flange in it in radial direction; means for supplying the cavity with compressed fluid to press the plate of the diaphragm on said seat and to press the packing flange to the outer surface of the groove for sealing the cavity.

2. In a device of the character described in combination, a diaphragm comprising a flat plate and a packing flange, this latter being fitted at the rim of the plate, projecting beyond both sides of it, and capable of elastic deformation in radial direction; a casing provided with a cavity divided into two parts by the diaphragm, a groove provided in a side-wall of the casing and into which the packing flange penetrates, the width of said groove allowing for a displacement of the packing flange in it in radial direction, and an opening in said side-wall connecting the cavity to the groove and through which opening the plate of the diaphragm passes; means for supplying at least one of said two parts of the cavity with compressed fluid to press the packing flange to the wall of the groove for sealing off the two parts of the cavity from one another.

3. In a device according to claim 2, in which the casing is composed of two parts secured to one another, and in which the groove also consists of two parts, each of these parts being situated in one of the two parts of the casing and both parts joined at the division plane of the casing parts, whereby the packing flange serves alike for sealing both parts of the cavity from one another and sealing each of these parts from a space which is in communication with the groove via the division plane of the two casing parts.

4. In a device of the character described in combination, a diaphragm comprising a flat plate and a packing flange, this latter being filled at the rim of the plate projecting beyond its plane and being capable of elastic deformation in radial direction; a casing provided with a cavity closed by the diaphragm and adapted to be charged with compressed fluid, a seat provided on that side of the plate which is away from the cavity, and sustaining the rim of the plate in axial direction, and a wall facing the outer surface of the packing flange; a member serving for the transmission of the movement of the central part of the diaphragm plate, the said member being provided movable in the casing, and means of maintaining said member permanently in contact with the diaphragm plate; whereby compressed fluid present in said cavity bends the plate of the diaphragm in axial direction and presses the packing flange to the said wall for sealing the cavity.

5. In a device according to claim 4, a disk fitted to said member, said disk serving to transmit the movement of the central part of the diaphragm plate, resting against the diaphragm plate on the side away from the cavity, and extending almost to the seat sustaining the outer rim of the diaphragm plate, the disk serving furthermore of restricting the deformation of the diaphragm plate in axial direction to that part of the latter situated in the vicinity of the seat.

6. In a device according to claim 4, a disk fitted to said member, said disk serving to transmit the movement of the central part of the diaphragm plate, resting against the diaphragm plate on the side away from the cavity, and extending almost to the seat sustaining the outer rim of the diaphragm plate, the disk serving furthermore of restricting the deformation of the diaphragm plate in axial direction to that part of the latter situated in the vicinity of the seat, and stops secured to the casing serving the purpose of limiting the axial displacement of the said member when the plate of the diaphragm is bent by the action of the fluid.

7. In a device of the character described in combination, a diaphragm comprising a flat plate having a hole in its central part and two packing flanges, elastically deformable in radial direction, and projecting above the plane of the diaphragm plate, of which flanges one is fitted to the outer rim of the diaphragm plate and a second one to the inner rim enclosing the hole; a casing provided with a cavity closed by the diaphragm and adapted to be charged with compressed fluid, a seat provided on that side of the plate which is away from the cavity and sustaining the plate of the diaphragm in axial direction, and a wall facing the outer surface of the outer packing flange; a part fitted through the hole in the diaphragm plate such part being rigidly secured to the latter and serving to transmit the movement of the central part of the diaphragm plate and against which the inner packing flange rests; whereby a compressed fluid present in the cavity bends the diaphragm plate in axial direction and presses the outer packing flange against the wall and the inner packing flange against the said part.

8. In a device of the character described in combination, a diaphragm comprising a flat plate, a movable part rigidly fixed to the center part of the plate and a packing flange, this latter being fitted at the rim of the plate, projecting beyond one side of it and being capable of radial deformation; a casing provided with a cavity divided into two parts, a first seat serving to sustain the outer rim of the diaphragm plate in an axial direction pointing to a first part of the cavity, a second seat adapted to engage said movable part to sustain the central part of the diaphragm plate in an axial direction pointing to the other part of the cavity, and a wall facing the outer surface of the packing flange; means for supplying compressed fluid to each of the two parts of the cavity, whereby the outer rim of the diaphragm plate is lifted up from said first seat and the central part of the diaphragm plate is held fixed by said movable part engaging said second seat when the pressure existing in the first part of the cavity outweighs that pressure present in the other part, so that both parts of the cavity are interconnected, whereas conversely, this rim is pressed against the first seat and the outer surface of the packing flange is pressed against the wall when the pressure existing in the second part of the cavity outweighs that pressure existing in the said first part of the cavity, so that both parts of the cavity are sealed off from one another.

9. A diaphragm comprising a flat plate, an outer and an inner packing flange, each standing up above the same side of the plate.

10. In a control device and the like, in combination, a casing enclosing a pressure chamber formed therein, a diaphragm within said casing and closing said chamber, said diaphragm comprising a plate which is elastically deformable in the axial direction, and a substantially cylindrical flange integral with said plate and located at the edge thereof, the free edge of said flange being elastically stretchable in the radial direction, said casing having a seat for said edge of the plate, and two concentrical cylindrical walls adjacent said seat, said walls forming a cylindrical groove closed to one side and open to the side of said seat and communicating with said chamber, said flange projecting into said groove, said groove being wider than said flange, whereby said flange is pressed against the outer one of said concentrical walls by pressure in said pressure chamber, thereby sealing the chamber.

11. In a control device and the like, in combination, a casing enclosing a pressure chamber formed therein, a diaphragm within said casing and closing said chamber, said diaphragm comprising a plate which is elastically deformable in the axial direction, and a substantially cylindrical flange integral with said plate and located at the edge thereof, the free edge of said flange being elastically stretchable in axial direction, said casing having a seat for said edge of the plate, and two concentrical cylindrical walls adjacent said seat, said walls forming a cylindrical groove closed to one side and open to the side of said seat and communicating with said chamber, said flange projecting into said groove, said groove being wider and deeper than said flange, whereby the edge of said flange is freely extended and said flange is pressed against the outer one of said concentrical walls by pressure in said pressure chamber, thereby sealing the chamber.

References Cited in the file of this patent

UNITED STATES PATENTS

| Number | Name | Date |
| --- | --- | --- |
| Re. 19,443 | De Vito | Jan. 29, 1935 |
| 1,454,547 | Lane | May 8, 1923 |
| 2,275,712 | Zand | Mar. 10, 1942 |
| 2,446,694 | Dickson | Aug. 10, 1948 |